United States Patent [19]
Dillon

[11] 3,760,457
[45] Sept. 25, 1973

[54] EVISCERATE WASTE HANDLING SYSTEM

[75] Inventor: Janus J. Dillon, Irving, Tex.

[73] Assignee: Food Equipment, Inc., Dallas, Tex.

[22] Filed: Nov. 26, 1971

[21] Appl. No.: 202,203

[52] U.S. Cl. .................................................. 17/11
[51] Int. Cl. ............................................. A22b 3/08
[58] Field of Search ................... 137/525.1, 525; 17/11

[56] References Cited
UNITED STATES PATENTS
2,839,781  6/1958  Jaruis ..................................... 17/11
3,125,114  3/1964  Langdon ........................... 137/525.1

*Primary Examiner*—Robert Peshock
*Attorney*—D. Carl Richards et al.

[57] ABSTRACT

A system for handling eviscerate wastes removed during processing from animal food products, such as poultry. A plurality of handling hoppers are arranged in a processing line in which various parts of the poultry are removed. Each hopper in the line includes a system for periodically flushing the sides of the hopper with water. A continuous suction line is common to all of the hoppers and individually attached to the bottom of each one through a suction valve. The valve comprises a flexible synthetic sleeve having the center thereof normally pinched to a generally closed configuration, except for a pair of small apertures which allow passage of some air and liquid into the suction manifold at all times. When the hopper bottom contains a substantial amount of eviscerate material, the apertures are covered and the suction action from the manifold combined with gravity causes the pinched sleeve to open so that the eviscerate material is drawn down into the vacuum disposal system to be collected at a central reservoir.

10 Claims, 13 Drawing Figures

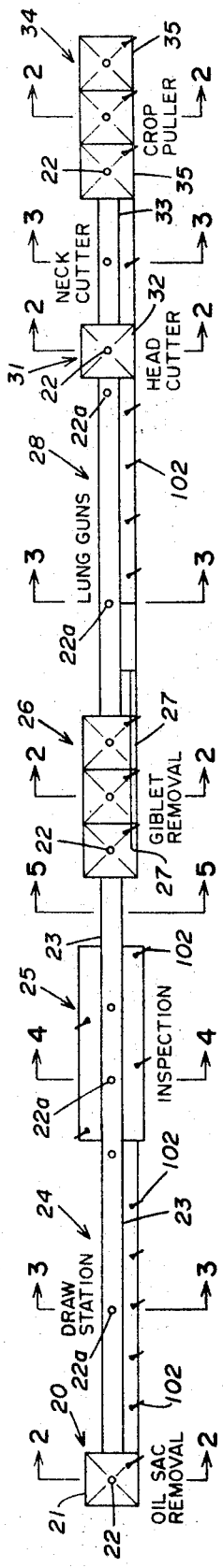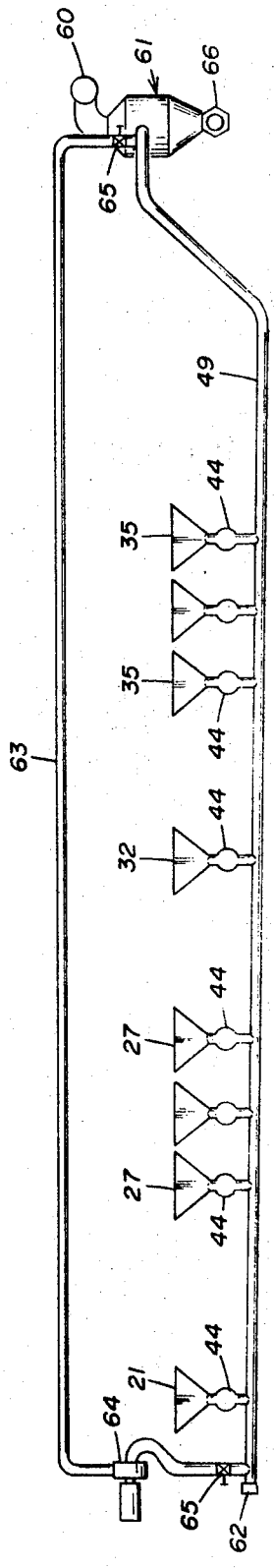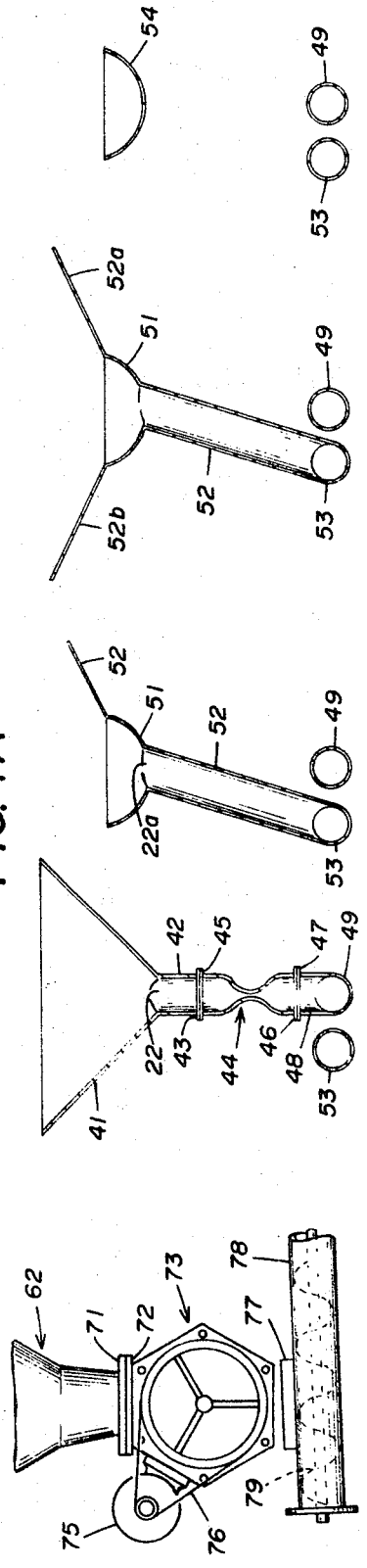

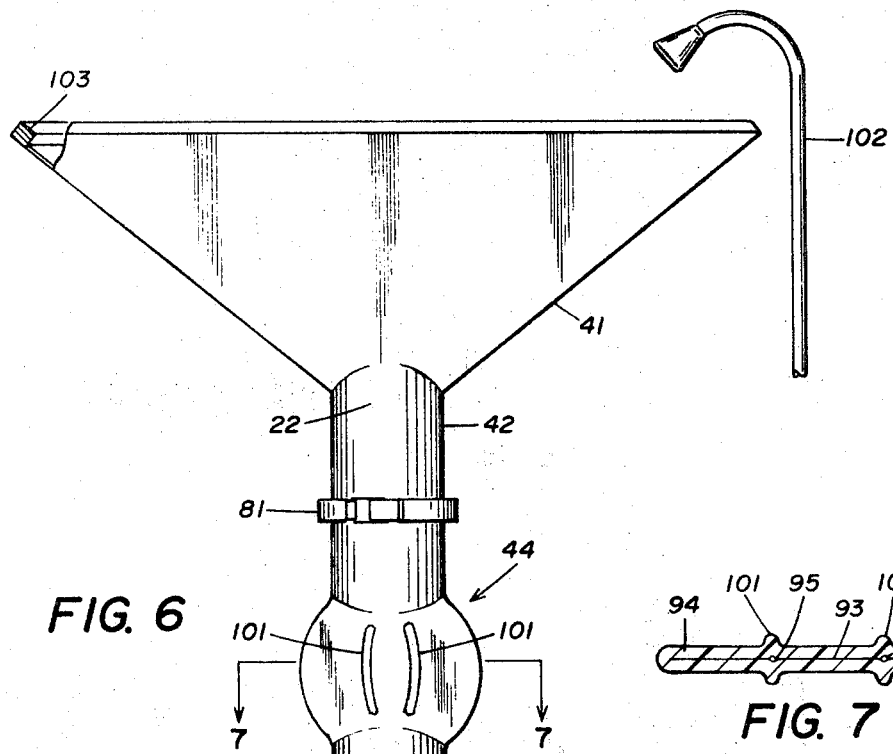
FIG. 6
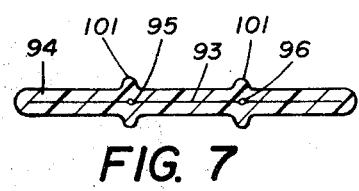
FIG. 7
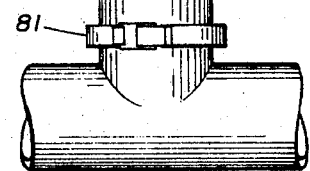
FIG. 6A
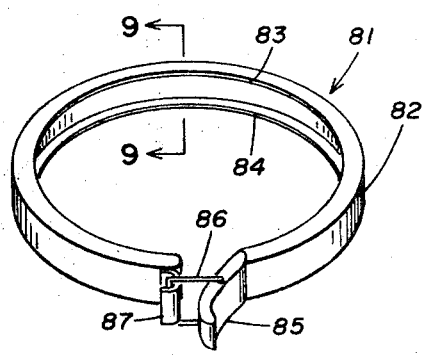
FIG. 8
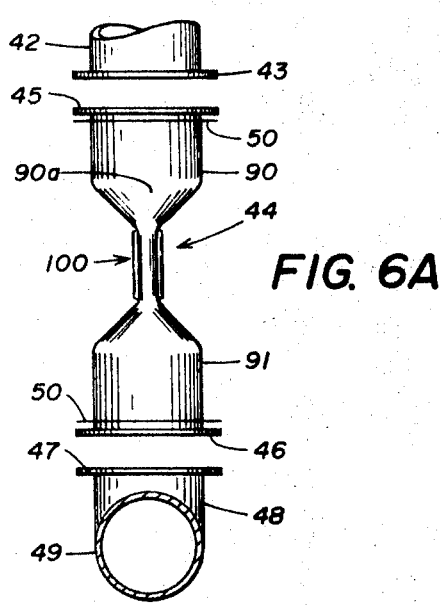
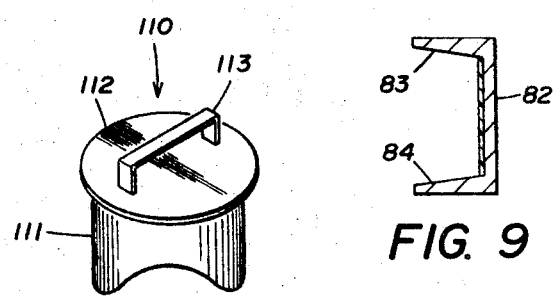
FIG. 10
FIG. 9

EVISCERATE WASTE HANDLING SYSTEM

BACKGROUND OF THE INVENTION

1. Field of the Invention

The invention relates to fowl processing apparatus and more particularly to a suction system for disposing of eviscerate material produced during processing of fowl.

2. History of the Prior Art

Due to an increase in demand for edible, ready-to-cook fowl, the fowl processing industry is converting to automated procedures in order to increase production. As an aid to automation, many prior systems have included individual poultry handling stations along a trough within which waste portions of a fowl are disposed. Prior systems have generally included a flushing mechanism by which water is continuously flowed down the sides of the trough to wash eviscerate material into a drain. Continuous flushing is expensive because of the large volume of water required and, further, the water and fluid must be separated from the eviscerate material before the material can be employed for other useful by-products such as pet food. In addition to the expense of continuous water flow in prior art systems, the mixture of fluid and eviscerate material lying at the bottom of or flowing down a trough presents a rather unsightly mess which is distasteful to some workers.

A further disadvantage of prior art processing is that the trough drains must be cleaned frequently and, in order to comply with governmental cleanliness standards, all of the equipment must be periodically cleaned and washed with a detergent. The system of the present invention is much more adapted to a simple clean-in-place cycle than are conventional processing lines.

The present system provides a poultry processing line having two separate systems of waste disposal, for the processing stations. A simple drain is provided for stations at which the only waste products produced are liquids such as water and bodily fluids from the poultry. At other processing stations at which eviscerate material is produced as a by-product, a separate hopper with a suction removal and disposal system is provided in combination with a novel means of sealing the suction manifold from the handling hopper.

SUMMARY OF THE INVENTION

The invention relates to a system for handling eviscerate wastes removed during processing of animal food products which includes a plurality of processing stations spaced from one another. Each of the stations includes a handling hopper for disposal of eviscerate wastes. A suction manifold is connected to the bottom of each hopper through a normally closed valve. The valve opens in response to the presence of eviscerate wastes in the bottom of the hopper to permit passage of the eviscerate wastes into the suction manifold for disposal.

BRIEF DESCRIPTION OF THE DRAWING

For a more complete understanding of the present invention and the advantages thereof, reference may be had to the following description taken in conjunction with the accompanying drawing in which:

FIG. 1 is a diagrammatic top view of a poultry processing line constructed in accordance with the invention;

FIG. 1A is a schematic diagram of the suction disposal system of the invention;

FIG. 1B is a diagrammatic side view of an apparatus for removing eviscerate waste from the suction disposal system of FIG. 1A;

FIG. 2 is a cross-section taken at lines 2—2 of FIG. 1.

FIG. 3 is a cross-section taken at lines 3—3 of FIG. 1;

FIG. 4 is a cross-section taken at lines 4—4 of FIG. 1; and

FIG. 5 is a cross-section taken at lines 5—5 of FIG. 1;

FIG. 6 is a side view of a handling hopper incorporating a suction seal valve constructed in accordance with the invention;

FIG. 6A is a front view of the suction seal valve of FIG. 6 showing the manner of disassembly for cleaning;

FIG. 7 is a cross-section of the suction seal valve constructed in accordance with the invention taken at lines 7—7 of FIG. 6;

FIG. 8 is a perspective view of the valve disassembly clamp shown in FIG. 6;

FIG. 9 is a cross-section view of the clamp of FIG. 8 taken along the lines 9—9; and FIG. 10 is a plug for sealing the suction manifold of the system of the invention when it is cleaned in place.

DETAILED DESCRIPTION

Referring to FIG. 1, there is shown a fowl processing line which incorporates the system of the present invention. A plurality of picked, singed and washed fowl having the hocks removed are mounted on conveyor shackles (not shown) which move past a series of processing stations 20, 24, 25, 26, 28, 31, 33 and 34. At certain stations, only water and bodily fluids are dripped from the fowl. At these stations a simple trough and drain are provided to dispose of the liquid. At other processing stations a substantial quantity of both fluid and solid eviscerate material are removed from the fowl by an operator. At these locations a processing hopper and suction manifold are provided in accordance with the invention to remove the waste and collect it at a central reservoir for use as a by-product.

At the first processing station 20 the fowl are suspended above a handling hopper 21 and an operator removes the oil sacs from the bodies of the fowl. The removed material is dropped into the hopper 21. Periodically, the side walls of the hopper are flushed with water and the eviscerate material is drawn into an opening 22 of the suction disposal system of the invention, as will be further explained below. The fowl next pass above a trough 23 along which is mounted a draw station 24 at which the bodies of the fowl are opened and the entrails hung outside in preparation for inspection.

The bottom of the trough 23 is connected to a non-suction fluid drain opening 22a so that water and fluid dripping from the fowl is caught and drained away. After draining, the fowl pass on along the trough 23 into an inspection station 25. The trough section 23 at the inspection station 25 is also connected to a non-suction drain line 22a, since only water and fluid materials from the bird need be disposed of at this point.

After inspection, the fowl pass on along above the trough section 23 prior to reaching a giblet removal station 26 comprising a plurality of handling hoppers 27. At this station the heart, liver and other edible parts of the birds are cut off and separated while the remainder of the entrails are dropped into one of the hoppers 27. The side walls of each of the hoppers 27 are periodically flushed with water and the drain for each 21 is connected to an opening in the suction manifold for removal of the eviscerate material. After giblet removal, the fowl then pass above a trough 28 along which are mounted a plurality of lung removal guns (not shown). The lungs of the birds are vacuum removed by the guns and disposed of by an independent suction system. The only wastes from the fowl at this station is liquid which is removed by the non-suction drains 22a.

After lung removal, the fowl are passed to a head-cutting station 31 including a handling hopper 32. Because solid wastes are produced at this station the hopper 32 is connected to an opening 22 in the suction manifold for disposal. The fowl are then moved along a trough 33, having a non-suction drain 22a, into a crop removal station 34. At this station a hole is opened up completely through each of the birds and certain solid waste material is produced. The crop removal station 34 comprises a plurality of handling hoppers 35 each of which is connected to an opening 22 in the suction manifold for disposal of the solid wastes.

Each one of the handling hoppers 21, 27, 32 and 35 includes a periodically operated flushing mechanism which runs water down all sides of the hopper to wash solid material into the opening at the bottom. The fowl processing line also includes a plurality of hand wash stations 102 for use as required by workers.

FIG. 2 is a cross-section view of each one of the handling hoppers at stations 20, 26, 31 and 34. Each hopper comprises an inverted four-walled cone 41 which tapers to an opening 22. The opening 22 is connected to a cylindrical section 42 having a flange 43 at the bottom end thereof. The suction sealing valve of the invention, denoted generally by 44, is coupled to the flange 43 by a mating flange member 45. The valve 44 includes a lower flange 46 which is coupled to a suction line 49 through a mating flange member 47 and a short cylindrical section 48. The valve 44 prevents the suction line from being completely open to the atmosphere at all times. The operation and structure of the valve 44 will be explained in further detail below in connection with FIGS. 6, 6A and 7.

Trough sections at the draw stations 23, the lung gun station 28, and the neck cutter section 33 are each identical and shown in cross-section at FIG. 3. They include a semicylindrical trough portion 51 having a splash plate 52 extending from one side. At the lower center section of each of the troughs is located a non-suction drain 22a which leads to a cylindrical tube 52 connected to a fluid drain line 53. The suction drain line 49 is not connected to the trough portion 51.

The trough 23 at the inspection station 24 is as shown in FIG. 4 and is identical in cross-section to that shown in FIG. 3 except that a pair of splash plates 52a and 52b are employed. The same trough portion 51, drain conduit 52 and non-suction drain line 53 are used, and, as in FIG. 3, the suction line 49 is not connected.

As shown in FIG. 5, the space between the inspection station 24 and the giblet removal station 26 is filled by a short trough section 54 which, since no operators are present, has no splash plates. The trough section 54 is connected by drain 22a to the non-suction fluid drain line 53 but not to the suction drain line 49.

The suction waste removal portion of the fowl processing line shown in FIG. 1 is illustrated schematically in FIG. 1a. Each one of the handling hoppers 21, 27, 32 and 35 are connected to a common suction drain line 49 through a valve 44. One end of the suction line 49 is connected to an enclosed collection reservoir comprising a cyclone separator 61. A vacuum pump 60 is connected to the separator 61 to apply a suction to the end of the line 49. The other end of the suction line 49 is terminated by an air control valve 62 which regulates the amount of suction present in the line 49. The valve 62 allows some flow at all times so that eviscerate material introduced into the line will be moved into the separator 61. A return line 63 extends from one end of the suction line 49, through a clean-in-place pump 64, to the other end of the suction line 49. The return line 63 is connected into the suction system for cleaning purposes by means of a pair of valves 65. The lines are cleaned in place by removing the valves 44 and sealing each one of the openings in the suction line 49. Detergent and water are introduced into the system and circulated through the suction line 49, the return line 63 and the clean-in-place pump 64.

A continuous suction on the order of from 2 inches to 16 inches of water is continuously maintained on the line 49 by the vacuum pump 60 and the air control valve 62. Whenever enough eviscerate material is deposited in or flushed into the opening 22 at the bottom of each of the handling hoppers, the material is drawn down through the valve 44 into the line and from there carried into the cyclone separator 61. The cyclone separator 61 acts to separate fluids such as water and blood from the solid eviscerate materials. Solid material accumulates at the bottom of the separator 62 and is removed periodically by means of a squirrel cage waste removal arrangement 66 which is shown in more detail in FIG. 1B.

As shown in FIG. 1B, the squirrel cage waste removal system 66 comprises the open bottom portion of the cyclone separator 62 including a flange 71 which mates to a flange 72 on a squirrel cage conveyor 73 shown with a side removed to expose the interior. Mounted for rotation within the conveyor 73 are a plurality of paddle wheels 74 which are driven at a preselected speed by an electric motor 75 and a belt 76. As the paddle wheels 74 revolve, eviscerate material is removed from the bottom opening of the separator 62 and dropped through an opening 77 in a screw conveyor 78. The eviscerate material is then moved by means of a screw 79 within the conveyor 78, or any other suitable method, to a truck or directly to a plant for processing the eviscerate into a useful product, such as dog food. In this way, eviscerate material is continously removed from the cyclone separator 61 and there is no need to shut down operations in order to remove the material except when it is desired to clean the entire system.

A detailed side view of one of the handling hoppers is shown in FIG. 6. Each hopper comprises an inverted four-sided stainless steel pyramid 41 having sides which taper toward an opening 22 connected to a cylindrical tube 42. As shown in FIG. 6A, the cylindrical tube 42 is terminated by a flange 43 which mates with a flange 45 on one end of the valve 44. The other end of the valve 44 is terminated by a flange 46 which mates with a flange 47 connected to the suction line 49 by a short cylindrical section 48. Stainless steel washers 50 are provided at either end of the valve 44 so that the pieces may be connected together as shown in FIG. 6 by a quick coupling clamp 81 which is shown in detail in FIG. 8. All of the pieces shown in FIGS. 6 and 6A are preferably made of stainless steel for sanitation.

As shown in FIG. 8, the quick coupling clamp 81 comprises a circular band 82 having an inwardly extending edge 83 and an inwardly extending lower edge 84. The edges 83 and 84 are separated from one another by a distance sufficient to accommodate, on the upper connection, the flange 43, the flange 45, and the washer 50, and, on the lower connection, the flange 47, the flange 46 and the washer 50. The clamp 81 includes a pivotally mounted handle 85 at one end which is connected at the center to a U-shaped bracket 86. The bracket 86 is arranged for engagement with a hook 87 formed on the other end of the clamp. The clamp 81 is operated to hold two flanges and a washer together by placing the bracket 86 over the hook 87 and pressing the handle 85 down into engagement with the surface of the band 82. The band is thereby contracted to clamp all th pieces into tight engagement with one another. Similarly, the clamp 81 can be easily removed to disassemble the pieces for cleaning.

Referring again to FIG. 6, the valve 44 is shown in a side view illustrating the wide profile in one direction. In contrast, FIG. 6A illustrates a front view of the valve 44 showing the narrow profile in the other perpendicular direction. The valve 44 is preferably a one-piece tubular sleeve formed of a synthetic flexible material such as neoprene. Referring to FIG. 6A, the valve 44 comprises generally cylindrical end sections 90 and 91 to which are fixed the flanges 45 and 46. The end sections 90 and 91 taper toward a central expansible restriction 100 which is normally in a pinched configuration. On either side of the flat surfaces of the central restriction 100 are a pair of protuberant ribs 101 which serve as strengthening and reinforcing material to maintain the proper shape of the valve.

A cross-section view of the pinched central restriction 100 is shown in FIG. 7. The internal construction of the expansible restriction 100 comprises a pair of inwardly extending walls 93 and 94 which abut one another to form a continuous closed panel. A pair of annular openings 95 and 96 are formed through the walls 93 and 94 so that a prescribed amount of fluid may pass through the valve 44 at all times. The openings 94 and 95 allow a small flow of air to pass from the bottom of the hopper 44 into the suction 49 when the hopper is completely empty. Water and poultry fluid, such as blood, are drawn into the suction line as soon as they reach the valve 44. When a fluent solid, such as eviscerate material, has accumulated within the upper cylindrical end section 90, which forms a collection region 90a, in such a quantity as to close off the openings 95 and 96, the suction from the line 49 will draw the material through the expansible restriction 100 into the line 49. After the material has passed, the restriction 100 returns it its normal pinched configuration and the only openings through the valve 44 are the openings 95 and 96.

The construction of the valve 44 effectively seals the suction line 49 from excess leakage. The small openings through the valve permit fluids to be exhausted without fully opening the valve, and allow enough continuous suction and flow through the valve so that accumulated eviscerate material will automatically be drawn through the valve into the line 49.

The system is cleaned as follows. The handling hopper 41 and the sleeve 42 are washed down in place with water and detergent which passes into the suction manifold 49. The two clamps 81 are then taken off and the valve 44 removed. A cleaning plug 110, as shown in FIG. 10, comprises a cylindrical sleeve 111 having a flat circular plate 112 mounted thereon to which is attached a handle 113. The plug 110 is inserted into the lower flange 47 on the cylindrical member 48 to plug the opening in the suction line 49. The entire system shown in FIG. 1A, including the suction line 49, is then cleaned in place by introducing water and detergent into the system and recirculating it with the pump 64. Other cleaning devices for pipelines, such as pigs, can be run through the suction line 49 whenever necessary to thoroughly clean the line.

For cleaning a single line installation, a return line from the point of entrance of the suction line into the cyclone separator to the far end of the suction line with an intermediate opening for introduction of cleaning solution is all that is required. On a two or more suction line installation, cross-connection between suction lines is added and one pump can be used to circulate the cleaning solution through all the main lines.

Referring to FIG. 6, the periodic hopper flush system comprises an annular pipe 103 which extends around the inner periphery of the hopper 41. The pipe 103 has a plurality of holes formed to spray water down the sides of the hopper 41. The pipe 103 is connected to a water source which is timed with a solenoid or geared to the movement of the fowl conveyor (not shown) so that water flushes periodically down the sides of the hopper. For example, the system may flush for 20 seconds out of each minute. The hand wash stations 102 may be of a type similar to that set forth in co-pending patent application Ser. No. 170,788 filed Aug. 11, 1971, in the name of Clarence G. Dawson.

From the above description of the system of the invention it can be seen that the removal of eviscerate material accumulated during poultry processing is greatly simplified. Further, it is much easier to maintain sanitary operating conditions within a processing plant by using the sealed vacuum eviscerate handling system of the present invention.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for handling eviscerate wastes removed during processing of animal food products, comprising:
   a plurality of processing stations spaced from one another, each of which includes a handling hopper for disposal of eviscerate wastes;
   a suction manifold;
   a valve connected between the bottom of each of said handling hoppers and said suction manifold, said valve including
   a flexible sleeve having cylindrical sections at opposed upper and lower ends and a normally closed central restriction, said upper end being connected to said hopper and said lower end being connected to said suction manifold;

an opening formed through the central restriction in said sleeve for allowing communication between the suction manifold and the upper end of said sleeve to drain liquids and to expand the central restriction in said flexible sleeve by drawing eviscerate wastes therethrough into said manifold in response to the accumulation of sufficient wastes within the upper end of said sleeve to close said opening.

2. A system for handling eviscerate wastes as set forth in claim 1 wherein said suction manifold includes a suction conduit extending beneath each of said handling hoppers and connected to each of said valves;

an enclosed reservoir connected to one end of said conduit;

a vacuum pump connected to said reservoir for creating a suction within said conduit to draw eviscerate wastes through said conduit into said reservoir; and an air flow control valve connected between the other end of said conduit and the atmosphere for adjusting the degree of suction in said conduit.

3. A system for handling eviscerate wastes as set forth in claim 1 wherein said reservoir includes a cyclone separator for removing fluids from the eviscerate wastes collected therein.

4. A system for handling eviscerate wastes as set forth in claim 1 wherein the central restriction in said sleeve is formed by the opposed walls of said sleeve in an abutting, pinched relationship to form a closed panel, and said opening is formed through the panel.

5. A system for handling eviscerate wastes as set forth in claim 2 which also includes a return line;

a pair of normally closed cleaning valves connecting opposed ends of said return line to opposed ends of said suction conduit; and means for recirculating fluid through said suction conduit and return line when said cleaning valves are open to clean the suction conduit of contaminates.

6. A system for handling eviscerate wastes as set forth in claim 3 which also includes conveyor means for removing the separated solid eviscerate wastes from said cyclone separator and transporting the wastes to a disposal location.

7. A system for handling eviscerate wastes as set forth in claim 3 which also includes means for periodically flushing the sides of each of said hoppers with water to remove lodged eviscerate material.

8. A system for handling wastes removed during processing of animal food products, comprising:

a plurality of processing stations arranged in a processing line and including a plurality of processing hoppers, and a plurality of elongated troughs a suction manifold extending beneath each of said processing hoppers in the line;

a non-suction fluid drain line extending beneath each of said troughs in the line;

a conduit connecting each of said hoppers with said suction manifold for drawing eviscerate wastes into said manifold for disposal thereof; and a conduit connecting each of said troughs with said fluid drain line for disposal of liquid wastes collected in said troughs.

9. A valve for regulating the passage of fluent solids from a collection region on one side of the valve into a suction line connected to the other side of the valve only upon accumulation of a preselected quantity of said solids within said collection region, said valve comprising a generally tubular flexible sleeve having an upper tubular section for receiving fluent solids and a lower tubular section adapted for communication with a suction line;

a normally closed expansible restriction in said flexible sleeve between the upper and lower tubular sections to define a collection region within the upper section;

a small opening through said expansible restriction for allowing air and fluid flow from the collection region into the suction line to draw accumulated fluent solid material through said expansible restriction upon a sufficient accumulation of material to block said opening.

10. A valve for regulating the passage of fluent solids as set forth in claim 9 wherein said normally closed expansible restriction is formed by the opposed walls of said tubular sleeve being pinched together.

* * * * *

PO-1050
(5/69)

UNITED STATES PATENT OFFICE
CERTIFICATE OF CORRECTION

Patent No. 3,760,457                    Dated    September 25, 1973

Inventor(s)  Janus J. Dillon

It is certified that error appears in the above-identified patent and that said Letters Patent are hereby corrected as shown below:

Col. 5, line 25 [page 11, line 9], "th" should be --the--.

Col. 7, line 26 [Claim 5, line 2],, "Claim 1" should be --Claim 2--.

Signed and sealed this 25th day of December 1973.

(SEAL)
Attest:

EDWARD M. FLETCHER, JR.            RENE D. TEGTMEYER
Attesting Officer                  Acting Commissioner of Patents